Jan. 1, 1929.

C. G. CLEMENT 1,697,047

COVERED DUMPING BODY

Filed July 29, 1925

Witness
J. R. McKnight

Inventor:
Charles G. Clement.
by Burton & Burton
his Attorneys.

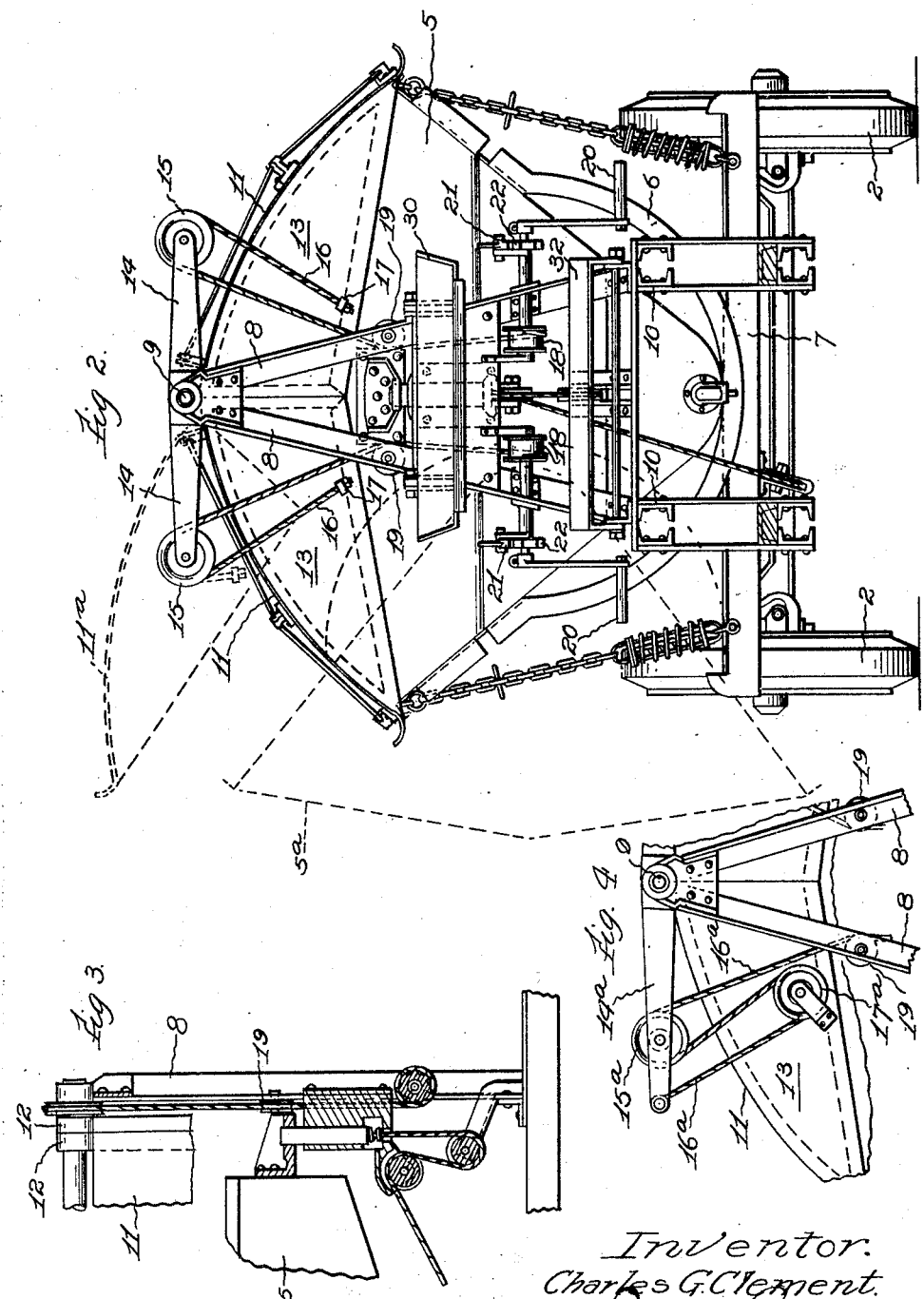

Patented Jan. 1, 1929.

1,697,047

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

COVERED DUMPING BODY.

Application filed July 29, 1925. Serial No. 46,730.

This invention relates to vehicle bodies of the hopper type in which the body is mounted for tilting by rolling upon a main frame of the vehicle for the purpose of dumping its contents. The object of the invention is to provide covering means for such a body, adapted to be opened at will, and so mounted as not to alter the center of gravity of the tilting body, or interfere with the dumping motion. It consists in certain features and elements of construction in combination as herein described and shown in the drawings and as indicated by the claims.

In the drawings:—

Figure 2 is an end elevation of the body and its support, but with the adjacent wheels and running gear removed for showing the body more clearly.

Figure 3 is a vertical detail section taken substantially at the medial plane of the vehicle at one end for showing the body-locking mechanism and the relation of the covers thereto.

Figure 4 is a partial end elevation showing a modified form of cover-lifting mechanism.

Figure 1:
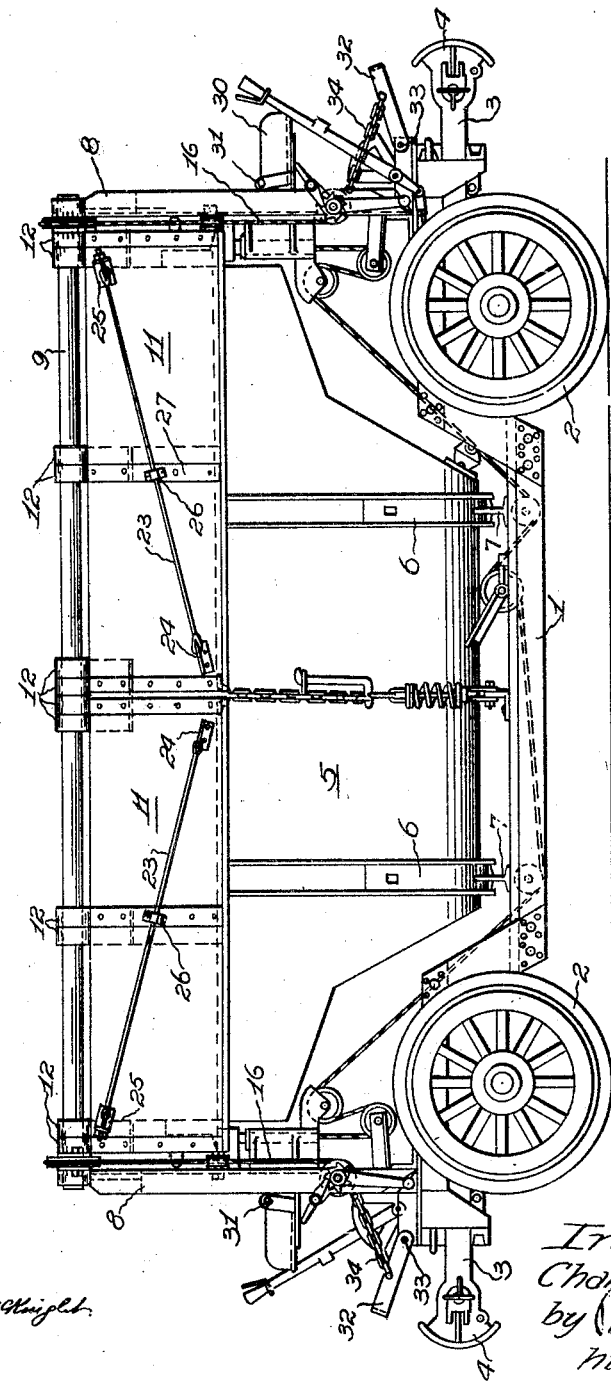
Figure 1 is a side elevation of a trailer type of vehicle carrying a hopper body fitted with covers embodying this invention.

In the construction illustrated the trailer comprises a drop frame, 1, which is supported on four wheels, 2, preferably steering wheels having suitable connections with draw-bars, 3, for control of the steering mechanism when they are attached to a tractor vehicle or pulled by a team of horses hitched to a tongue inserted in the coupling head, 4, of the drawbar. Suitable locking mechanism, not shown, is provided for preventing steering movement of the rear pair of wheels when desired. The load-carrying body is in the form of an upwardly open hopper, 5, fitted with rockers, 6, of channel section, which are mounted to roll laterally upon cross rails, 7, carried by the drop frame so as to facilitate discharge of the load from the body when it is rolled over on its side to the position indicated at 5ᵃ in dotted outline in Figure 2. The center of gravity of the hopper body, 5, is so located with respect to the rockers, 6, that the body may be readily returned to upright load-receiving position by hand. Therefore, it is desirable in providing any form of cover, that the cover shall not be attached to the body, since that would tend to shift the center of gravity laterally in tilted position of the body and render it difficult to return the body by hand from its dumping position to upright position.

As shown in the drawings, an A-frame of angle members 8, 8, is erected at each end of the body upon the end portion, 10, of the main frame, and a longitudinal member, 9, preferably in the form of a pipe, is supported by the A-frames over the center line of the body. For convenience the covers, 11, are made in four parts, two at each side of the pipe, 9, and hinged thereto for swinging upwardly to a position shown in dotted lines at 11ᵃ on Figure 2, to permit loading the hopper body, 5. Each cover is fitted at its upper edge with eyes or rings, 12, encircling the pipe, 9, and serving as hinge members, and each cover may be provided at its outer end with a skirt or flange, 13, preferably depending slightly below the level of the upper edge of the hopper body, 5, and overlapping the latter.

For lifting the covers to loading position the A-frame at each end of the body supports laterally-extended arms, 14, carrying pulleys, 15, over each of which passes a cable, 16, anchored at 17 to the cover skirt or flange, 13. The opposite end of the cable is attached to a winding drum, 18, toward which it is guided over a pulley, 19, pivoted on one of the members 8. A hand crank, 20, is provided for operating the winding drum, 18, while a pawl, 21, and ratchet wheel 22 on the shaft of the drum, 18, serve for holding the cable, 16, at any position of adjustment, such as that required for supporting the cover at the elevated position indicated at 11ᵃ in Figure 2. In this position the cover is raised quite clear of the body so as to permit loading the latter or rolling it over to the dumping position indicated at 5ᵃ. Preferably the contour of the covers is such that the side of the body which rises in the rolling movement describes a path which lies entirely under one of the covers, and, of course, passes under the fixed frame member, 9. This renders it only necessary to raise the covers at that side of the body at which the load is to be dumped.

Since the covers are preferably made of rather thin material, and since the lifting cables, 16, are attached only at one end of each cover, there is some tendency for the weight of the material to cause warping or twisting of the cover as it is lifted, unless some auxiliary stiffening means is provided. For this purpose truss members, 23, in the form of rods or cables, are stretched diagonally over each cover from the anchoring brackets, 24 and 25, attached near opposite corners of the cover, and with a strut bracket, 26, at about the middle of the cover and preferably secured to the reinforcing strap, 27, which forms a part of one of the hinges, 12. Thus the lifting stress is transmitted from the flanged end of the cover to the opposite end without unduly distorting the cover itself.

To keep the construction as compact as possible I prefer to mount the driving seats, 30, so that they may be folded up close against the A-frames, 8, and likewise the foot-boards, 32, are hinged at 33 for folding back within the length of the main frame, while chains, 34, are arranged to support them when in extended position, as shown in Figure 1. Where the covers 11 are specially heavy, the work of raising them may be made somewhat easier by extending the arm, 14, slightly farther, as shown at 14$^a$ in Figure 4, and anchoring the cable, 16$^a$, at the extreme end of the arm, 14$^a$. This cable is then led around a pulley, 17$^a$, on the end flange, 13, of the cover, 11, and thence around the pulley, 15$^a$, on the arm, 14$^a$, thus reducing by one-half the effort required to operate the winding crank, 20.

I claim:—

1. In combination with a vehicle frame and a tiltable body thereon, a cover for the body, frame structure supporting the cover independently of the body, a pulley supported on said frame structure, a cable trained over the pulley and connected to the cover for raising and lowering the same, said frame structure comprising a longitudinally-extending member fixed in spaced relation above the body when the latter is in its normal load-carrying position, said cover being hinged to said frame member, and the frame structure including also an arm extending laterally from such hinge axis for supporting the said pulley.

2. In combination with a vehicle frame and a tiltable body thereon, a cover for the body, frame structure supporting the cover independently of the body, a pulley supported on said frame structure, a cable trained over the pulley and connected to the cover for raising and lowering the same, said tiltable body being arranged to roll laterally for discharging its load at the side of the vehicle, said frame structure comprising upright portions at each end of the body with a longitudinal member connecting them in spaced relation above the body and the pulley support comprising a laterally-extending arm carried by one of the uprights.

3. In combination with a vehicle frame and a tiltable body thereon adapted for discharging its load at the side of the vehicle, upright frame members at each end of the body and a longitudinal member connecting them in spaced relation above the body at the middle, together with a plurality of covers for the body hinged to said longitudinal member, laterally-extending arms on the uprights with a pulley pivoted near the outer end of each arm, cables attached to the covers respectively and each passing over one of the pulleys, and separate winding drums for said cables journalled on the frame.

4. In combination with a vehicle frame and a tiltable body thereon, a cover for the body, and frame structure supporting said cover independently of the body by a hinged connection at one end of the cover, together with mechanism for raising the cover by engagement therewith near one of the edges adjacent its hinged edge, and means for stiffening said cover comprising a truss extending diagonally across its upper surface from a corner adjacent the hinged edge to the opposite corner remote from the point of attachment of the lifting means.

5. In the combination defined in claim 4, said truss comprising brackets attached to the cover at said opposite corners and a flexible member stretched between said brackets with a strut disposed between the cover and said member intermediate the ends of the member.

6. In combination with a vehicle frame and a tiltable body thereon, a cover for the body, and a frame structure supporting said cover independently of the body by a hinged connection with one edge of the cover, a fixed arm extending from the frame structure above the level of the cover, a pulley on said arm and a pulley on the cover, a cable anchored to said arm passing around the pulley on the cover and thence over the pulley on the arm, together with a drum for winding said cable to raise the cover.

In testimony whereof, I have hereunto set my hand at Chicago, Illinois, this 25th day of July, 1925.

CHARLES G. CLEMENT.